(12) United States Patent
Yu et al.

(10) Patent No.: US 11,305,775 B2
(45) Date of Patent: Apr. 19, 2022

(54) APPARATUS AND METHOD FOR CHANGING LANE OF AUTONOMOUS VEHICLE

(71) Applicant: LG ELECTRONICS INC., Seoul (KR)

(72) Inventors: Jun Young Yu, Gyeonggi-do (KR); Soo Jung Jeon, Gyeonggi-do (KR); Dae Geun Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 305 days.

(21) Appl. No.: 16/570,523

(22) Filed: Sep. 13, 2019

(65) Prior Publication Data
US 2020/0079380 A1   Mar. 12, 2020

(30) Foreign Application Priority Data
Aug. 16, 2019   (KR) .......................... 10-2019-0100064

(51) Int. Cl.
| | | |
|---|---|---|
| *B60W 30/18* | (2012.01) | |
| *B60W 40/105* | (2012.01) | |
| *G06K 9/00* | (2022.01) | |
| *G06N 3/04* | (2006.01) | |
| *H04W 4/40* | (2018.01) | |

(52) U.S. Cl.
CPC .... *B60W 30/18163* (2013.01); *B60W 40/105* (2013.01); *G06K 9/00798* (2013.01); *G06K 9/00825* (2013.01); *G06N 3/04* (2013.01); *H04W 4/40* (2018.02); *B60W 2554/80* (2020.02); *B60W 2556/65* (2020.02)

(58) Field of Classification Search
CPC ............................................ B60W 30/18163
See application file for complete search history.

(56) References Cited

U.S. PATENT DOCUMENTS

| | | | |
|---|---|---|---|
| 2009/0060647 A1* | 3/2009 | Denison | E01C 1/02 404/1 |
| 2013/0268174 A1* | 10/2013 | Koshizen | G08G 1/00 701/96 |
| 2016/0335890 A1* | 11/2016 | Bernhardt | G08G 1/096716 |
| 2017/0043780 A1* | 2/2017 | Yoon | B60W 10/04 |
| 2017/0151958 A1* | 6/2017 | Sakuma | G01C 21/3664 |
| 2019/0329777 A1* | 10/2019 | Rajab | B60W 60/00272 |
| 2019/0364492 A1* | 11/2019 | Azizi | H04W 48/16 |
| 2020/0239031 A1* | 7/2020 | Ran | G08G 1/0112 |

FOREIGN PATENT DOCUMENTS

KR   20170085750 A   7/2017

* cited by examiner

*Primary Examiner* — Alex C Dunn
(74) *Attorney, Agent, or Firm* — Fish & Richardson P.C.

(57) ABSTRACT

According to one embodiment of the present disclosure, a lane changing apparatus of an autonomous vehicle configured to change a driving lane in consideration of a congested situation includes a controller configured to determine whether an expected driving lane is congested based on driving information, and a communicator configured to receive the driving information. At least one among an autonomous driving vehicle, a user terminal, and a server according to embodiments of the present disclosure may be associated or integrated with an artificial intelligence module, a drone (unmanned aerial vehicle (UAV)), a robot, an augmented reality (AR) device, a virtual reality (VR) device, and a 5G service related device.

8 Claims, 12 Drawing Sheets

APPARATUS AND METHOD FOR CHANGING LANE OF AUTONOMOUS VEHICLE

CROSS-REFERENCE TO RELATED APPLICATION

This application claims benefit of priority to Korean Patent Application No. 10-2019-0100064, filed on Aug. 16, 2019, the entire disclosure of which is incorporated herein by reference.

BACKGROUND

1. Technical Field

The present disclosure relates to a lane changing system of a vehicle, and more particularly, to an apparatus and a method for changing a lane of an autonomous vehicle configured to change lanes in advance in consideration of traffic congestion.

2. Description of the Related Art

As user's requirements regarding vehicles increase, various systems have been developed to improve a driver's safety and convenience. In addition, autonomous vehicles are actively being developed.

When an autonomous vehicle is driven, the autonomous vehicle may slow down or change a lane of an ego vehicle in accordance with a speed of a preceding vehicle in a line of sight, without separate manipulation of a driver.

As a related art relating to changing lanes of an autonomous vehicle, Korean Patent Application Publication No. 10-2017-0085750 discloses a method for tracking laterally moving vehicles among vehicles which are driving ahead of the autonomous vehicle, and changing lanes in accordance with the number of laterally moving vehicles.

However, according to the method for changing lanes of the related art disclosed in Korean Patent Application Publication No. 10-2017-0085750, a lane of the ego vehicle is changed to a lane which is not busy in accordance with the lateral movement, and thus, only an operation of moving the ego vehicle from a highly congested lane to a less-congested lane may be supported.

For this reason, if the lane is not changed in advance before the congestion becomes severe, such as a situation of an exit or entrance section, the technique disclosed in Korean Patent Application Publication No. 10-2017-0085750 may be unable to handle a situation in which it is difficult to change lanes even though it is necessary to change lanes.

Therefore, there is a demand for a technology capable of reducing the possibility of a vehicle having to deviate from a route due to a lane change failure, such as when the vehicle cannot enter a congested lane leading to an exit or entrance section, by changing lanes in advance when congestion is predicted in an expected driving lane.

SUMMARY OF THE INVENTION

An aspect of the present disclosure is to provide an apparatus and a method for changing a lane of an autonomous vehicle capable of smoothly changing lanes along a normal route by predicting a congested situation of an expected driving lane in advance, rather than a lane changing method which simply avoids the congested lane.

Another aspect of an embodiment of the present disclosure is to provide an apparatus and a method for changing a lane of an autonomous vehicle capable of detecting a space where the lane can be changed, and determining an optimal space to be entered in accordance with a tendency of vehicles driving ahead and behind the detected space, so as enable the autonomous vehicle to stably change lanes.

The present disclosure is not limited to what has been described above, and other aspects not mentioned herein will be apparent from the following description to a person of ordinary skill in the art to which the present disclosure pertains A lane changing apparatus of an autonomous vehicle according to an embodiment of the present disclosure may, when a congested situation is predicted based on driving information, search for at least two enterable spaces in an expected driving lane, and change lanes by selecting, among the searched spaces, a space where the lane may be easily changed.

Specifically, according to this embodiment of the present disclosure, a lane changing apparatus of an autonomous vehicle configured to change a driving lane in consideration of a congested situation may include a controller configured to determine whether an expected driving lane is congested based on driving information, search for a first space and a second space, which are vehicle enterable spaces in the expected driving lane, and determine a space to be entered based on a comparison result between a characteristic of the first space and a characteristic of the second space based on determination that the expected driving lane is congested, and control the autonomous vehicle to change lanes along a lane changing route leading to the space to be entered, and a communicator configured to receive the driving information, and wherein the comparison result between the characteristic of the first space and the characteristic of the second space may include a result of comparing a size of the first space and a size of the second space.

In this embodiment of the present disclosure, the driving information may include a driving lane speed which is a chassis speed of an ego vehicle and an expected driving lane speed which is a chassis speed of a vehicle moving along the expected driving lane, and the controller may determine that the expected driving lane is congested when the driving lane speed exceeds the expected driving lane speed.

In this embodiment of the present disclosure, the driving information may include lane marker information, and when the number of solid lines of the lane marker between the driving lane on which the vehicle is driving and the expected driving lane decreases based on the lane marker information, the controller may determine that the expected driving lane is congested.

In this embodiment of the present disclosure, the driving information may include surrounding image information, and the controller may detect surrounding vehicles from the surrounding image, extract a time and space feature vector from an image frame including the detected surrounding vehicles, determine a number of vehicles which show a cutting-in tendency through a deep learning artificial neural network using the extracted time and space feature vector, and when the number of determined vehicles exceeds a predetermined threshold number, determine that the expected driving lane is congested.

In this embodiment of the present disclosure, the comparison result between the characteristic of the first space and the characteristic of the second space may further include a result of comparing an increase rate of a size of the first space and an increase rate of a size of the second space.

In the embodiment of the present disclosure, the lane changing apparatus may further include a communicator configured to communicate with a vehicle which is driving in the expected driving lane, and when the controller determines that the expected driving lane is congested, the controller may generate a yield request signal for changing lanes, and transmit the yield request signal to a vehicle which is driving in the expected driving lane through the communicator.

In this embodiment of the present disclosure, the controller may periodically update the comparison result between the characteristic of the first space and the characteristic of the second space, and change the space to be entered based on the updated comparison result, while not changing the space to be entered when a wheel of the ego vehicle has crossed the lane marker between the driving lane on which the ego vehicle is driving and the expected driving lane.

In this embodiment of the present disclosure, when the controller determines that a vehicle which is driving behind the first space is a non-yielding vehicle which is approaching the lane marker between the driving lane on which the vehicle is driving and the expected driving lane, the controller may reduce the size of the first space in accordance with a predetermined ratio before comparing the characteristic of the first space and the characteristic of the second space.

In this embodiment of the present disclosure, the communicator may receive the driving information based on a downlink grant of a 5G network connected to drive the autonomous vehicle in an autonomous driving mode.

According to another embodiment of the present disclosure, a lane changing method of an autonomous vehicle which changes a driving lane in consideration of a congested situation may include a first step of determining whether an expected driving lane is congested based on driving information, a second step of searching for a first space and a second space, which are vehicle enterable spaces in the expected driving lane, and determining a space to be entered based on a comparison result between a characteristic of the first space and a characteristic of the second space when it is determined that the expected driving lane is congested, and a third step of controlling the autonomous vehicle to change a lane along a lane changing route leading to the space to be entered, wherein the comparison result between the characteristic of the first space and the characteristic of the second space may include a result of comparing a size of the first space and a size of the second space.

In this embodiment of the present disclosure, the driving information may include a driving lane speed which is a chassis speed of an ego vehicle and an expected driving lane speed which is a chassis speed of a vehicle moving along the expected driving lane, and the first step may include determining that the expected driving lane is congested when the driving lane speed exceeds the expected driving lane speed.

In this embodiment of the present disclosure, the driving information may include lane marker information, and the first step may include determining that the expected driving lane is congested when the number of solid lines of the lane marker between the driving lane on which the ego vehicle is driving and the expected driving lane decreases based on the lane marker information.

In this embodiment of the present disclosure, the driving information may include surrounding image information, and the first step may include detecting surrounding vehicles from the surrounding image, extracting a time and space feature vector from an image frame including the detected surrounding vehicles, determining a number of vehicles which show a cutting-in tendency through a deep learning artificial neural network using the extracted time and space feature vector, and determining that the expected driving lane is congested when the number of determined vehicles exceeds a predetermined threshold number.

In this embodiment of the present disclosure, the comparison result between the characteristic of the first space and the characteristic of the second space further may further include a result of comparing an increase rate of a size of the first space and an increase rate of a size of the second space.

In this embodiment of the present disclosure, the second step may include generating a yield request signal for changing lanes, and transmitting the yield request signal to a vehicle which is driving in the expected driving lane through the communicator when it is determined that the expected driving lane is congested in the first step.

In this embodiment of the present disclosure, the second step may include periodically updating the comparison result between the characteristic of the first space and the characteristic of the second space, and changing the space to be entered based on the updated comparison result, while not changing the space to be entered when a wheel of the ego vehicle has crossed the lane marker between the driving lane on which the ego vehicle is driving and the expected driving lane.

In this embodiment of the present disclosure, the second step may include reducing the size of the first space in accordance with a predetermined ratio before comparing the characteristic of the first space and the characteristic of the second space, when it is determined that a vehicle which is driving behind the first space is a non-yielding vehicle which is approaching the lane marker between the driving lane on which the autonomous vehicle is driving and the expected driving lane.

According to another embodiment of the present disclosure, a computer-readable recording medium on which a lane changing program of an autonomous vehicle configured to change a driving lane in consideration of a congested situation is recorded, may include a first unit which determines whether an expected driving lane is congested based on driving information; a second unit which searches for a first space and a second space which are vehicle enterable spaces in the expected driving lane and determines a space to be entered based on a comparison result between a characteristic of the first space and a characteristic of the second space when it is determined that the expected driving lane is congested; and a third unit which controls the autonomous vehicle to change a lane along a lane changing route leading to the space to be entered, in which a comparison result between the characteristic of the first space and the characteristic of the second space includes a result of comparing a size of the first space and a size of the second space.

Details of other embodiments will be included in the detailed description and the drawings.

According to embodiments of the present disclosure, by properly determining and responding to a congested situation of an expected driving lane, a risk of deviating from a route due to lane change failure may be reduced.

According to the embodiments of the present disclosure, by recognizing in advance and responding to a congested situation of the expected driving lane, stable autonomous driving which does not block the traffic flow may be enabled.

Embodiments of the present disclosure are not limited to those described above, and other embodiments not mentioned above will be clearly understood from the description below.

BRIEF DESCRIPTION OF DRAWINGS

The above and other aspects, features, and advantages of the present disclosure will become apparent from the detailed description of the following aspects in conjunction with the accompanying drawings, in which.

DETAILED DESCRIPTION

Figure 1:
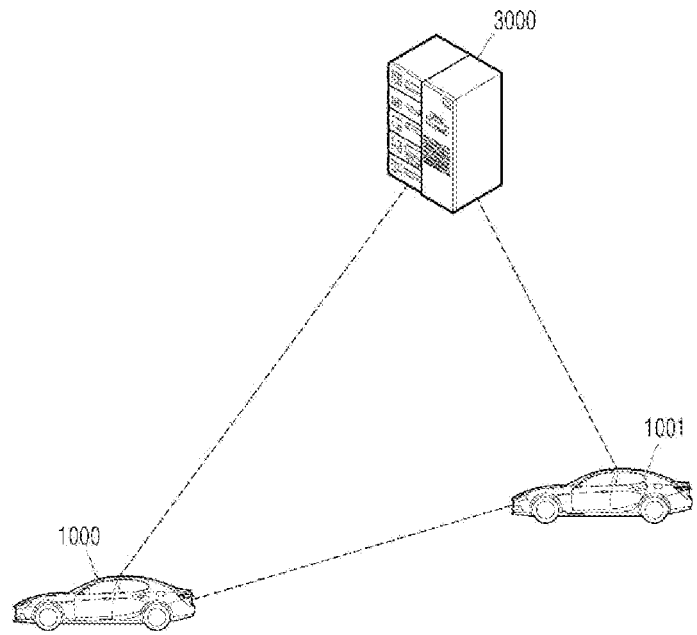
FIG. 1 is a diagram illustrating a system to which a lane changing apparatus of an autonomous vehicle according to an embodiment of the present disclosure is applied.

Hereinafter, the embodiments disclosed in the present specification will be described in detail with reference to the accompanying drawings, the same or similar elements regardless of a reference numeral is denoted by the same reference numeral and a duplicate description thereof will be omitted. In the following description, the terms "module" and "unit" for referring to elements are assigned and used exchangeably in consideration of convenience of explanation, and thus, the terms per se do not necessarily have different meanings or functions. In the following description of the embodiments disclosed herein, the detailed description of related known technology will be omitted when it may obscure the subject matter of the embodiments according to the present disclosure. The accompanying drawings are merely used to help easily understand embodiments of the present disclosure, and it should be understood that the technical idea of the present disclosure is not limited by the accompanying drawings, and these embodiments include all changes, equivalents or alternatives within the idea and the technical scope of the present disclosure.

Although the terms first, second, third, and the like, may be used herein to describe various elements, components, regions, layers, and/or sections, these elements, components, regions, layers, and/or sections should not be limited by these terms. These terms are generally only used to distinguish one element from another.

It should be understood that when an element is referred to as being "connected to," or "coupled to" another element, it can be directly connected or coupled to the other element, but intervening elements can also be present. The terms "connected" and "coupled" are not restricted to physical or mechanical connections or couplings, and can include electrical connections or couplings, whether direct or indirect. The connection can be such that the objects are permanently connected or releasably connected.

It must be noted that as used herein and in the appended claims, the singular forms "a," "an," and "the" include the plural references unless the context clearly dictates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

A vehicle described in this specification may refer to an automobile and a motorcycle. Hereinafter, the vehicle will be exemplified as an automobile.

The vehicle described in the specification may include, but is not limited to, a vehicle having an internal combustion engine as a power source, a hybrid vehicle having an engine and an electric motor as a power source, and an electric vehicle having an electric motor as a power source.

FIG. 1 is a diagram illustrating a system to which a lane changing apparatus of an autonomous vehicle according to an embodiment of the present disclosure is applied.

Referring to FIG. 1, a vehicle 1000 may receive driving information including a traffic situation from another vehicle 1001 or a server 3000 through vehicle to everything (V2X) communication. The vehicle 1000 may be an ego vehicle.

The ego vehicle 1000 may receive a control signal from the server 300 to change a lane based on a downlink grant of a 5G network.

Figure 2:
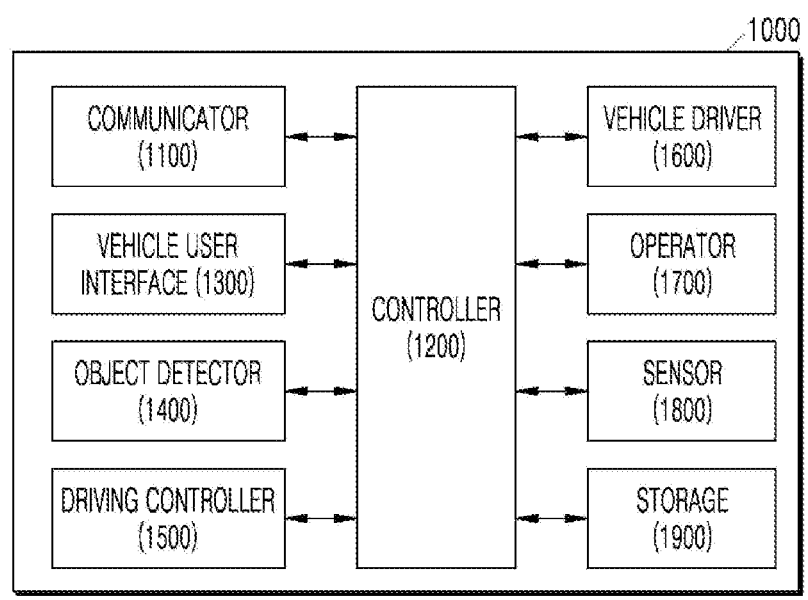
FIGS. 2 and 3 are block diagrams illustrating a lane changing apparatus of an autonomous vehicle according to an embodiment of the present disclosure which is installed in a vehicle.
Figure 3:
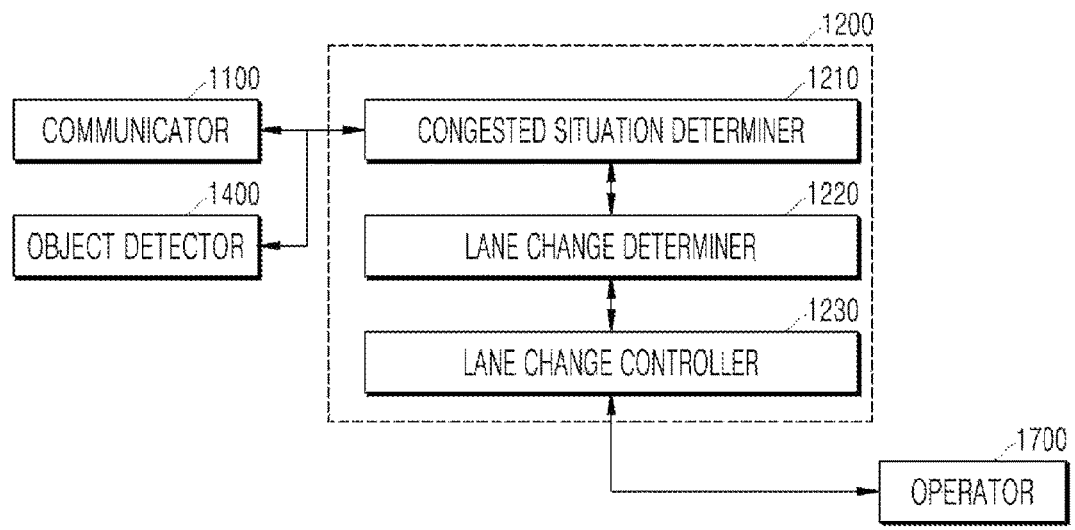

FIG. 2 is a block diagram illustrating a lane changing apparatus of an autonomous vehicle according to an embodiment of the present disclosure which is installed in a vehicle.

Referring to FIG. 2, the lane changing apparatus of an autonomous vehicle may include a communicator 1100, a vehicle controller 1200, a vehicle user interface 1300, an object detector 1400, a driving controller 1500, a vehicle driver 1600, an operator 1700, a sensor 1800, and a vehicle storage 1900.

Depending on the embodiment, the vehicle 1000 to which the lane changing apparatus of an autonomous vehicle is applied may include components other than those which are illustrated in FIG. 2 and described below, or may not include some of the components which are illustrated in FIG. 2 and described below. In FIG. 2, it is assumed that the lane changing apparatus of an autonomous vehicle is mounted in the ego vehicle 1000, but the same apparatus may be applied to the other vehicle 1001.

The mode of the vehicle 1000 may be switched from an autonomous driving mode to a manual mode or from the manual mode to the autonomous driving mode depending on the driving situation. Here, the driving situation may be determined by at least one of information received by the communicator 1100, external object information detected by the object detector 1400, or navigation information acquired by a navigation module.

The vehicle 1000 may switch the autonomous driving mode to the manual mode or the manual mode to the autonomous driving mode in accordance with a user input received through the vehicle user interface 1300.

When the vehicle 1000 is operated in the autonomous driving mode, the vehicle 1000 may be operated under the control of the operator 1700 that controls driving, parking, and unparking. In contrast, when the vehicle 1000 is operated in the manual mode, the vehicle 1000 may be operated by an input through a mechanical operation of the driver.

The communicator 1100 may be a module for performing communication with an external device. Here, the external device may be the other vehicle 1001 or the server 3000.

The communicator 1100 may include at least one of a transmission antenna, a reception antenna, a radio frequency (RF) circuit capable of implementing various communication protocols, or an RF element in order to perform communication.

The communicator 1100 may perform short range communication, GPS signal reception, V2X communication, optical communication, broadcasting transmission/reception, and intelligent transport system (ITS) communication functions.

Depending on the embodiment, the communicator 1100 may further support other functions than the described functions or may not support some of the described functions.

The communicator 1100 may support short-range communication by using at least one among Bluetooth™, Radio Frequency Identification (RFID), Infrared Data Association (IrDA), Ultra WideBand (UWB), ZigBee, Near Field Communication (NFC), Wireless-Fidelity (Wi-Fi), Wi-Fi Direct, and Wireless Universal Serial Bus (Wireless USB) technologies.

The communicator 1100 may form short-range wireless communication networks so as to perform short-range communication between the vehicle 1000 and at least one external device.

The communicator 1100 may include a Global Positioning System (GPS) module or a Differential Global Positioning System (DGPS) module for obtaining location information of the vehicle 1000.

The communicator 1100 may include a module for supporting wireless communication between the vehicle 1000 and a server 3000 (V2I: vehicle to infrastructure), communication with another vehicle (V2V: vehicle to vehicle) or communication with a pedestrian (V2P: vehicle to pedestrian). That is, the communicator 1100 may include a V2X communication module. The V2X communication module may include an RF circuit capable of implementing V2I, V2V, and V2P communication protocols.

The communicator 1100 may receive risk information broadcasting signals transmitted from other vehicles, and transmit risk information query signals and receive risk information response signals in response thereto, through the V2X communication module.

The communicator 1100 may include an optical communication module for performing communication with an external device via light. The optical communication module may include both a light transmitting module for converting electrical signals into optical signals and transmitting the optical signals to the outside, and a light receiving module for converting the received optical signals into electrical signals.

According to an embodiment, the light transmitting module may be integrally formed with a lamp included in the vehicle 1000.

The communicator 1100 may include a broadcast communication module for receiving broadcast signals from an external broadcast management server, or transmitting broadcast signals to the broadcast management server through broadcast channels. Examples of the broadcast channels may include a satellite channel and a terrestrial channel. Example of the broadcast signal may include a TV broadcast signal, a radio broadcast signal, and a data broadcast signal.

The communicator 1100 may include an ITS communication module that exchanges information, data or signals with a traffic system. The ITS communication module may provide the obtained information and data to the traffic system. The ITS communication module may receive information, data, or signals from the traffic system. For example, the ITS communication module may receive road traffic information from the communication system and provide the road traffic information to the vehicle controller 1200. For example, the ITS communication module may receive control signals from the traffic system and provide the control signals to the vehicle controller 1200 or a processor provided in the vehicle 1000.

Depending on the embodiment, the overall operation of each module of the communicator 1100 may be controlled by a separate process provided in the communicator 1100. The communicator 1100 may include a plurality of processors, or may not include a processor. When a processor is not included in the communicator 1100, the communicator 1100 may be operated by either a processor of another apparatus in the vehicle 1000 or the vehicle controller 1200.

The communicator 1100 may, together with the vehicle user interface 1300, implement a vehicle-use display device. In this case, the vehicle-use display device may be referred to as a telematics device or an audio video navigation (AVN) device.

Figure 4:
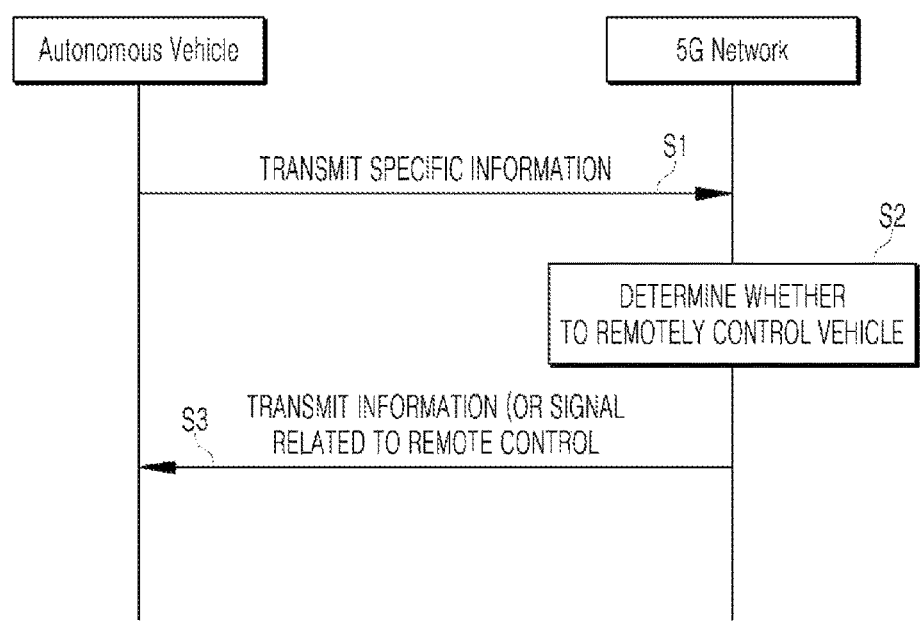
FIG. 4 is a diagram illustrating an example of a basic operation of an autonomous vehicle and a 5G network in a 5G communication system.
Figure 5:
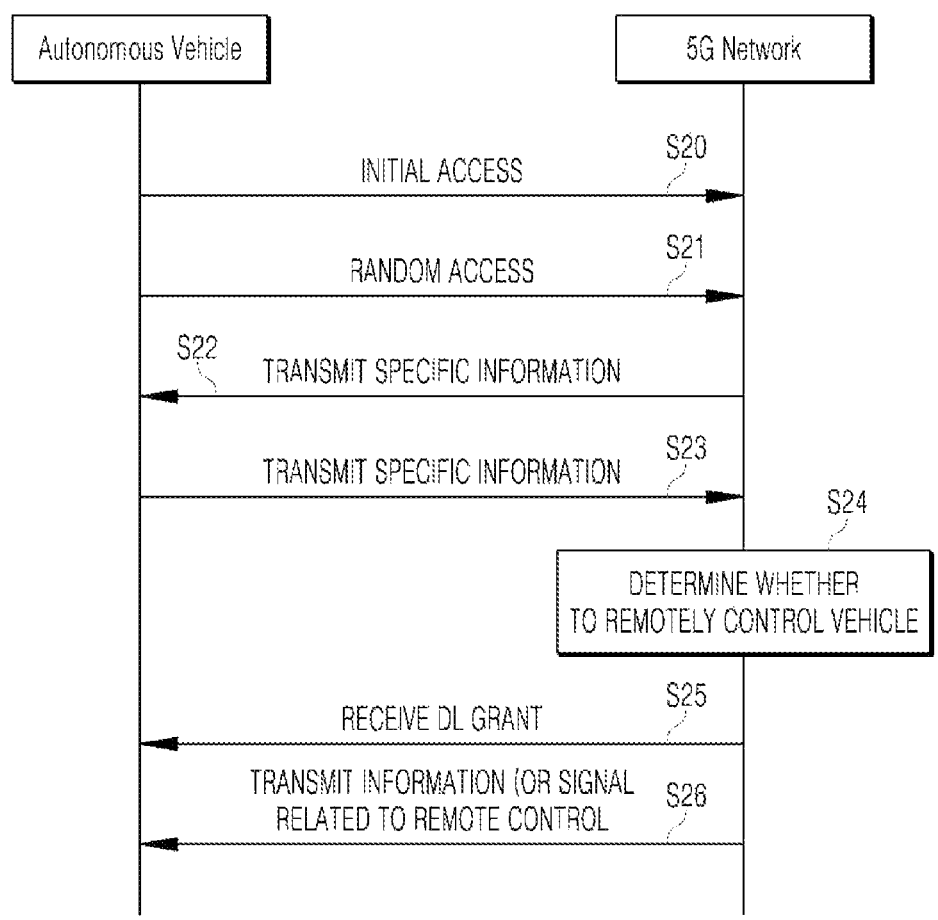
FIG. 5 is a diagram illustrating an example of an applied operation of an autonomous vehicle and a 5G network in a 5G communication system.

FIG. 4 is a diagram showing an example of the basic operation of an autonomous vehicle and a 5G network in a 5G communication system.

The communicator 1100 may transmit specific information over a 5G network when the vehicle 1000 is operated in the autonomous driving mode.

The specific information may include autonomous driving related information.

The autonomous driving related information may be information directly related to the driving control of the vehicle. For example, the autonomous driving related information may include at least one among object data indicating an object near the vehicle, map data, vehicle status data, vehicle location data, and driving plan data.

The autonomous driving related information may further include service information necessary for autonomous driving. For example, the specific information may include information on a destination inputted through the vehicle user interface 1300 and a safety rating of the vehicle.

In addition, the 5G network may determine whether a vehicle is to be remotely controlled (S2).

The 5G network may include a server or a module for performing remote control related to autonomous driving.

The 5G network may transmit information (or a signal) related to the remote control to an autonomous driving vehicle (S3).

As described above, information related to the remote control may be a signal directly applied to the autonomous driving vehicle, and may further include service information necessary for autonomous driving, such as driving information. The autonomous driving vehicle according to this embodiment may receive service information such as insurance for each interval selected on a driving route and risk interval information, through a server connected to the 5G network to provide services related to the autonomous driving.

An essential process for performing 5G communication between the autonomous driving vehicle 1000 and the 5G network (for example, an initial access process between the vehicle 1000 and the 5G network) will be briefly described with reference to FIG. 5 to FIG. 9 below.

An example of application operations through the autonomous driving vehicle 1000 performed in the 5G communication system and the 5G network is as follows.

The vehicle 1000 may perform an initial access process with the 5G network (initial access step, S20). The initial access process may include a cell search process for downlink (DL) synchronization acquisition and a process for obtaining system information.

The vehicle 1000 may perform a random access process with the 5G network (random access step, S21). The random access process may include a process for uplink (UL) synchronization acquisition or a preamble transmission process for UL data transmission, or a random access response receiving process.

The 5G network may transmit an Uplink (UL) grant for scheduling transmission of specific information to the autonomous driving vehicle 1000 (UL grant receiving step, S22).

The process in which the vehicle 1000 receives the UL grant may include a scheduling process for receiving a time/frequency source for the transmission of the UL data over the 5G network.

The autonomous driving vehicle 1000 may transmit specific information over the 5G network based on the UL grant (specific information transmission step, S23).

The 5G network may determine whether the vehicle 1000 is to be remotely controlled based on the specific information transmitted from the vehicle 1000 (vehicle remote control determination step, S24).

The autonomous driving vehicle 1000 may receive the DL grant through a physical DL control channel for receiving a response on pre-transmitted specific information from the 5G network (DL grant receiving step, S25).

The 5G network may transmit information (or a signal) related to the remote control to the autonomous driving vehicle 1000 based on the DL grant (remote control related information transmission step, S26).

A process in which the initial access process and/or the random access process between the 5G network and the autonomous driving vehicle 1000 is combined with the DL grant receiving process has been exemplified. However, the present disclosure is not limited thereto.

For example, the initial access process and/or the random access process may be performed through the initial access step, the UL grant receiving step, the specific information transmission step, the vehicle remote control determination step, and the remote control related information transmission step. In addition, for example, the initial access process and/or the random access process may be performed through the random access step, the UL grant receiving step, the specific information transmission step, the vehicle remote control determination step, and the remote control related information transmission step. The autonomous driving vehicle 1000 may be controlled by the combination of an AI operation and the DL grant receiving process through the specific information transmission step, the vehicle remote control determination step, the DL grant receiving step, and the remote control related information transmission step.

The operation of the autonomous driving vehicle 1000 described above is merely exemplary, but the present disclosure is not limited thereto.

For example, the operation of the autonomous driving vehicle 1000 may be performed by selectively combining the initial access step, the random access step, the UL grant receiving step, or the DL grant receiving step with the specific information transmission step, or the remote control related information transmission step. The operation of the autonomous driving vehicle 1000 may include the random access step, the UL grant receiving step, the specific information transmission step, and the remote control related information transmission step. The operation of the autonomous driving vehicle 1000 may include the initial access step, the random access step, the specific information transmission step, and the remote control related information transmission step. The operation of the autonomous driving vehicle 1000 may include the UL grant receiving step, the specific information transmission step, the DL grant receiving step, and the remote control related information transmission step.

Figure 6:
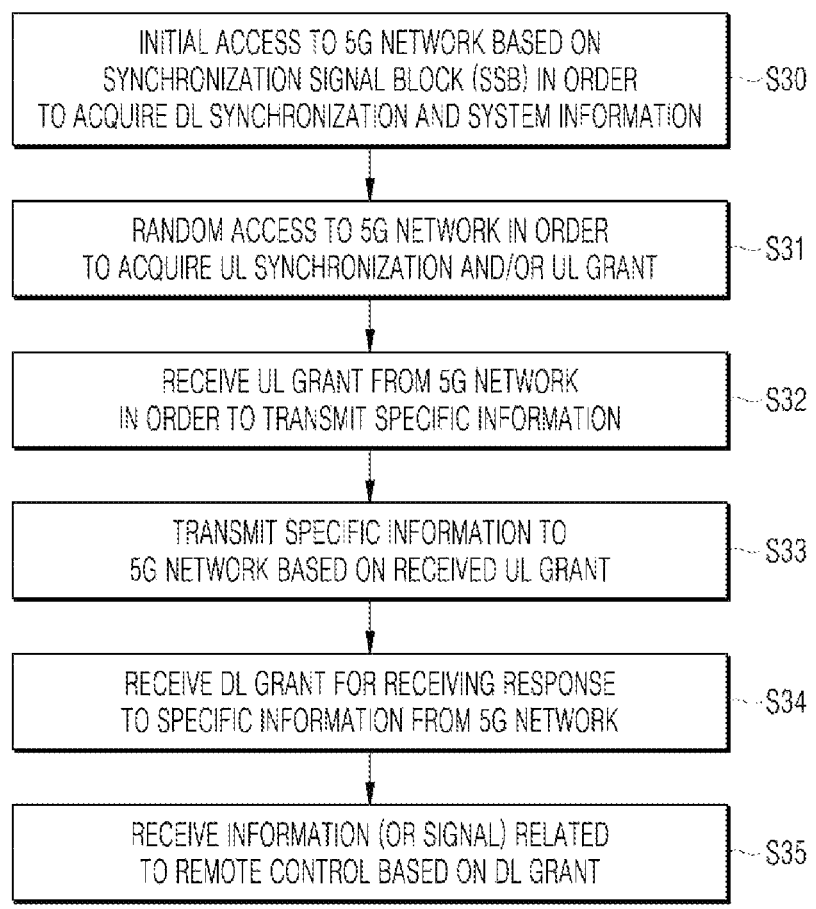
FIGS. 6 to 9 are diagrams illustrating an example of an operation of an autonomous vehicle using 5G communication.

As illustrated in FIG. 6, the vehicle 1000 including an autonomous driving module may perform an initial access process with the 5G network based on Synchronization Signal Block (SSB) in order to acquire DL synchronization and system information (initial access step).

The autonomous driving vehicle 1000 may perform a random access process with the 5G network for UL synchronization acquisition and/or UL transmission (random access step, S31).

The autonomous driving vehicle 1000 may receive the UL grant from the 5G network in order to transmit specific information (UL grant receiving step, S32).

The autonomous driving vehicle 1000 may transmit the specific information to the 5G network based on the UL grant (specific information transmission step, S33).

The autonomous driving vehicle 1000 may receive the DL grant from the 5G network for receiving a response to the specific information (DL grant receiving step, S34).

The autonomous driving vehicle 1000 may receive remote control related information (or a signal) from the 5G network based on the DL grant (remote control related information receiving step, S35).

A beam management (BM) process may be added to the initial access step, and a beam failure recovery process associated with Physical Random Access Channel (PRACH) transmission may be added to the random access step. QCL (Quasi Co-Located) relation may be added with respect to the beam reception direction of a Physical Downlink Control Channel (PDCCH) including the UL grant in the UL grant receiving step, and QCL relation may be added with respect to the beam transmission direction of the Physical Uplink Control Channel (PUCCH)/Physical Uplink Shared Channel (PUSCH) including specific information in the specific information transmission step. In addition, QCL relation may be added with respect to the beam reception direction of the PDCCH including the DL grant in the DL grant receiving step.

Figure 7:
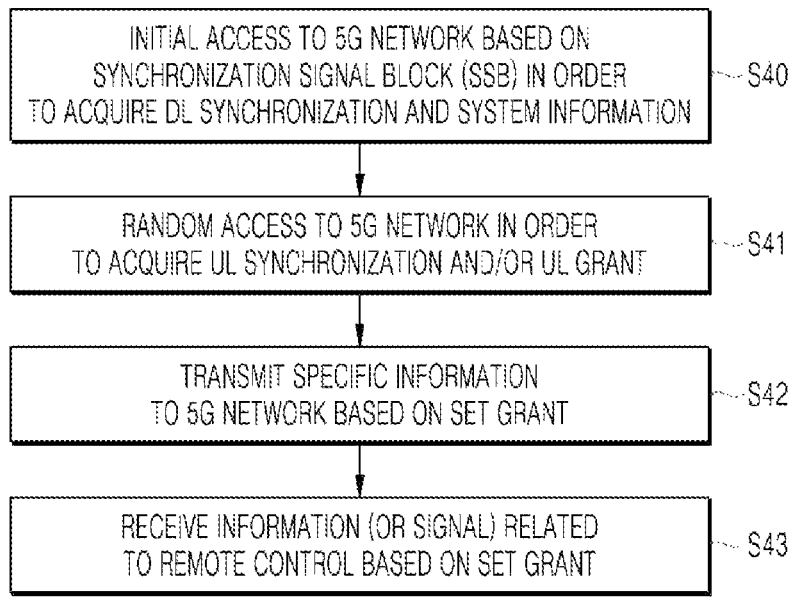

As illustrated in FIG. 7, the autonomous driving vehicle 1000 may perform an initial access process with the 5G network based on SSB in order to acquire DL synchronization and system information (initial access step, S40).

The autonomous driving vehicle 1000 may perform a random access process with the 5G network for UL synchronization acquisition and/or UL transmission (random access step, S41).

The autonomous driving vehicle 1000 may transmit specific information based on a configured grant to the 5G network (UL grant receiving step, S42). In other words, the autonomous driving vehicle 1000 may receive the configured grant instead of receiving the UL grant from the 5G network.

The autonomous driving vehicle 1000 may receive the remote control related information (or signals) from the 5G network based on the configured grant (remote control related information receiving step, S43).

Figure 8:
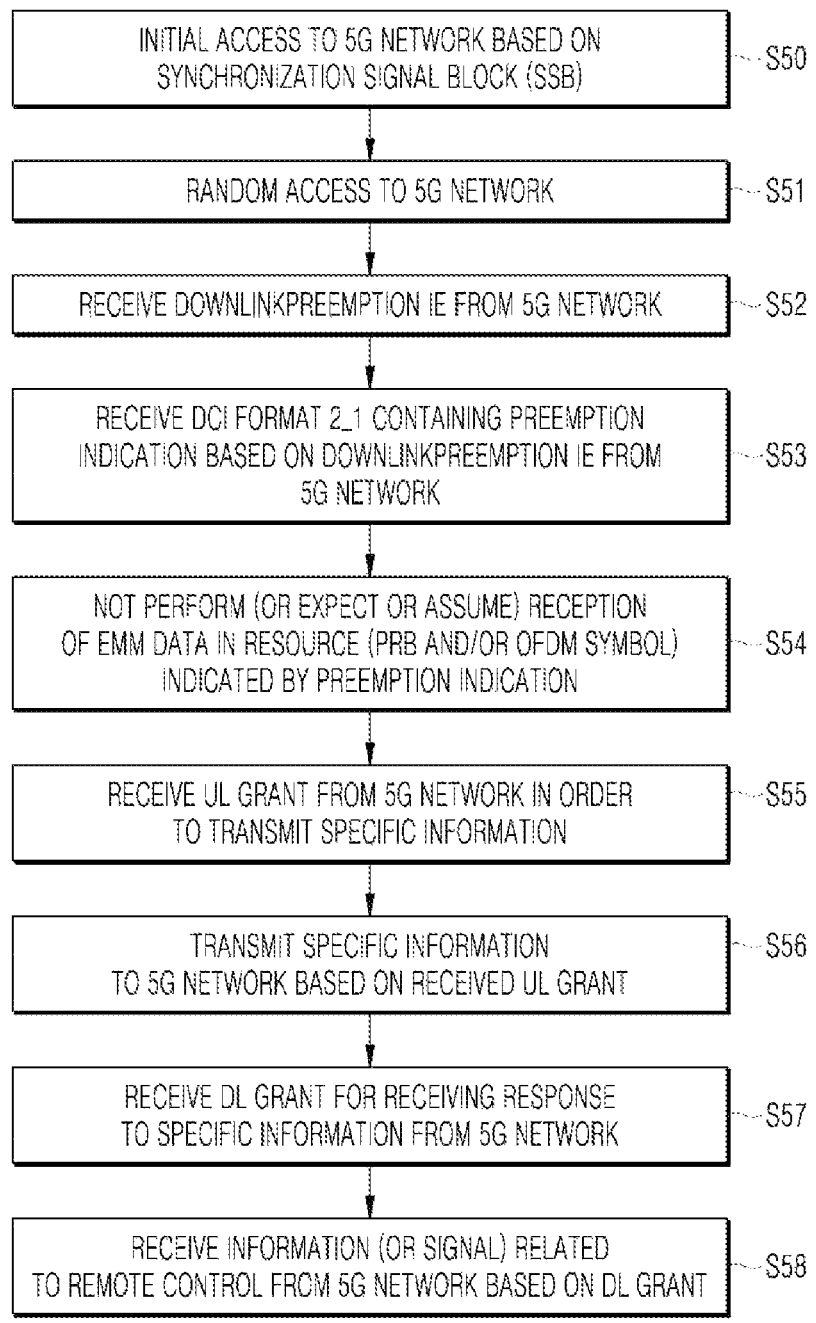

As illustrated in FIG. 8, the autonomous driving vehicle 1000 may perform an initial access process with the 5G network based on SSB in order to acquire DL synchronization and system information (initial access step, S50).

The autonomous driving vehicle 1000 may perform a random access process with the 5G network for UL synchronization acquisition and/or UL transmission (random access step, S51).

In addition, the autonomous driving vehicle 1000 may receive Downlink Preemption (DL) and Information Element (IE) from the 5G network (DL Preemption IE reception step, S52).

The autonomous driving vehicle 1000 may receive DCI (Downlink Control Information) format 2_1 including preemption indication based on the DL preemption IE from the 5G network (DCI format 2_1 receiving step, S53).

The autonomous driving vehicle 1000 may not perform (or expect or assume) the reception of eMBB data in the resource (PRB and/or OFDM symbol) indicated by the pre-emption indication (step of not receiving eMBB data, S54).

The autonomous driving vehicle 1000 may receive the UL grant over the 5G network in order to transmit specific information (UL grant receiving step, S55).

The autonomous driving vehicle 1000 may transmit the specific information to the 5G network based on the UL grant (specific information transmission step, S56).

The autonomous driving vehicle 1000 may receive the DL grant from the 5G network for receiving a response to the specific information (DL grant receiving step, S57).

The autonomous driving vehicle 1000 may receive the remote control related information (or signal) from the 5G network based on the DL grant (remote control related information receiving step, S58).

Figure 9:
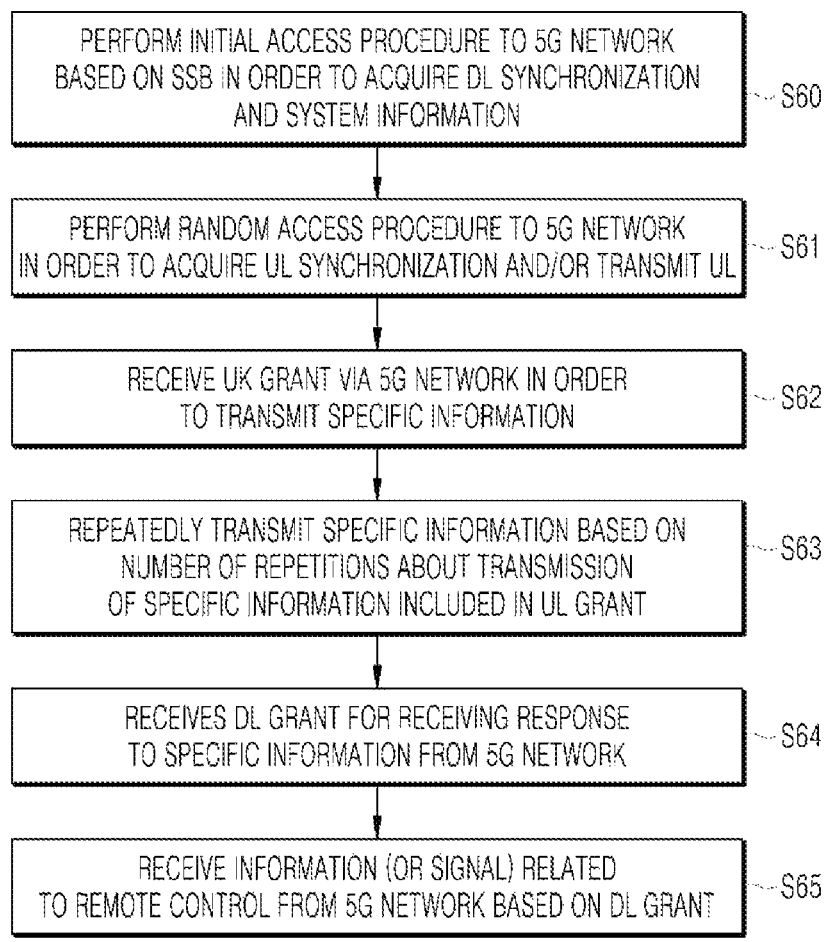

As illustrated in FIG. 9, the autonomous driving vehicle 1000 may perform an initial access process with the 5G network based on SSB in order to acquire DL synchronization and system information (initial access step, S60).

The autonomous driving vehicle 1000 may perform a random access process with the 5G network for UL synchronization acquisition and/or UL transmission (random access step, S61).

The autonomous driving vehicle 1000 may receive the UL grant over the 5G network in order to transmit specific information (UL grant receiving step, S62).

When specific information is transmitted repeatedly, the UL grant may include information on the number of repetitions, and the specific information may be repeatedly transmitted based on information on the number of repetitions (specific information repetition transmission step, S63).

The autonomous driving vehicle 1000 may transmit the specific information to the 5G network based on the UL grant.

The repeated transmission of the specific information may be performed by frequency hopping, and the first transmission of the specific information may be performed from a first frequency source, and the second transmission of the specific information may be performed from a second frequency source.

The specific information may be transmitted through Narrowband of Resource Block (6RB) and Resource Block (1RB).

The autonomous driving vehicle 1000 may receive the DL grant from the 5G network for receiving a response to the specific information (DL grant receiving step, S64).

The autonomous driving vehicle 1000 may receive the remote control related information (or signal) from the 5G network based on the DL grant (remote control related information receiving step, S65).

The above-described 5G communication technique can be applied in combination with the embodiments proposed in this specification, which will be described in FIG. 1 to FIG. 13*b*, or may be supplemented to specify or clarify the technical feature of the embodiments proposed in this specification.

The vehicle 1000 may be connected to an external server through a communication network, and may be capable of moving along a predetermined route without a driver's intervention by using an autonomous driving technique.

In the embodiments described below, a user may be interpreted as a driver, a passenger, or an owner of a user terminal.

While the vehicle 1000 is driving in the autonomous driving mode, the type and frequency of accidents may depend on the ability of the vehicle 1000 to sense surrounding risk elements in real time. The route to the destination may include intervals with different levels of risk due to various causes, such as weather, terrain characteristics, and traffic congestion.

At least one among an autonomous driving vehicle, a user terminal, or a server according to embodiments of the present disclosure may be associated or integrated with an artificial intelligence module, a drone (unmanned aerial vehicle (UAV)), a robot, an augmented reality (AR) device, a virtual reality (VR) device, and a 5G service related device.

For example, the vehicle 1000 may operate in association with at least one artificial intelligence module or robot included in the vehicle 1000 in the autonomous driving mode.

For example, the vehicle 1000 may interact with at least one robot. The robot may be an autonomous mobile robot (AMR) capable of driving by itself. Being capable of driving by itself, the AMR may freely move, and may include a plurality of sensors so as to avoid obstacles during traveling. The AMR may be a flying robot (such as a drone) equipped with a flight device. The AMR may be a wheel-type robot equipped with at least one wheel, and which is moved through the rotation of the at least one wheel. The AMR may be a leg-type robot equipped with at least one leg, and which is moved using the at least one leg.

The robot may function as a device that enhances the convenience of a user of a vehicle. For example, the robot may move a load placed in the vehicle 1000 to a final destination. For example, the robot may perform a function of providing route guidance to a final destination to a user who has alighted from the vehicle 1000. For example, the robot may perform a function of transporting the user who has alighted from the vehicle 1000 to the final destination At least one electronic apparatus included in the vehicle 1000 may communicate with the robot through a communication device.

At least one electronic apparatus included in the vehicle 1000 may provide, to the robot, data processed by the at least one electronic apparatus included in the vehicle 1000. For example, at least one electronic apparatus included in the vehicle 1000 may provide, to the robot, at least one among object data indicating an object near the vehicle, HD map data, vehicle status data, vehicle position data, and driving plan data.

At least one electronic apparatus included in the vehicle 1000 may receive, from the robot, data processed by the robot. At least one electronic apparatus included in the vehicle 1000 may receive at least one among sensing data sensed by the robot, object data, robot status data, robot location data, and robot movement plan data.

At least one electronic apparatus included in the vehicle 1000 may generate a control signal based on data received from the robot. For example, at least one electronic apparatus included in the vehicle may compare information on the object generated by an object detection device with information on the object generated by the robot, and generate a control signal based on the comparison result. At least one electronic apparatus included in the vehicle 1000 may generate a control signal so that interference between the vehicle movement route and the robot movement route may not occur.

At least one electronic apparatus included in the vehicle 1000 may include a software module or a hardware module for implementing an artificial intelligence (AI) (hereinafter referred to as an artificial intelligence module). At least one electronic apparatus included in the vehicle 1000 may input obtained data into the artificial intelligence module, and use data outputted from the artificial intelligence module.

The artificial intelligence module may perform machine learning of input data by using at least one artificial neural network (ANN). The artificial intelligence module may output driving plan data through machine learning of input data.

At least one electronic apparatus included in the vehicle 1000 may generate a control signal based on the data outputted from the artificial intelligence module.

According to the embodiment, at least one electronic apparatus included in the vehicle 1000 may receive data processed by an artificial intelligence from an external device through a communication device. At least one electronic apparatus included in the vehicle may generate a control signal based on the data processed by the artificial intelligence.

The vehicle controller 1200 may include a congested situation determiner 1210, a lane change determiner 1220, and a lane change controller 1230.

The vehicle controller 1200 may receive a control signal of the server 3000 through the communicator 1100, and control the autonomous driving mode operation in accordance with the control signal.

The congested situation determiner 1210 may determine whether an expected driving lane on which the vehicle will be driven later, such as an exit or entrance section, is congested, based on the driving information. The congested situation determiner 1210 may receive the driving information through the communicator 1100.

Here, the driving information may include a driving lane speed which is a chassis speed of the ego vehicle 1000, an expected driving lane speed which is a chassis speed of the other vehicle 1001 which is moving along the expected driving lane, and lane marker information.

The congested situation determiner 1210 may be provided with chassis information and pose information of surrounding vehicles including the other vehicle 1001 through the V2X communication module of the communicator 1100, and provided with pose information of the surrounding vehicles including the other vehicle 1001 through distance sensors such as a lidar, an ultrasonic sensor, a radar, and an infrared sensor of the objector detector 1400. The congested situation determiner 1210 may estimate speeds of surrounding vehicles by using the chassis information and pose information of the surrounding vehicles, and determine average speeds of a plurality of vehicles in the expected driving lane including the other vehicle among the surrounding vehicles as an expected driving lane speed.

The congested situation determiner 1210 may be provided with real-time traffic information from infrastructure through the V2X communication module of the communicator 1100, and determine the congested situation based on the provided real-time traffic information.

When the driving lane speed exceeds the expected driving lane speed, the congested situation determiner 1210 may determine that the expected driving lane is congested.

The congested situation determiner 1210 may obtain surrounding images through a camera module of the object detector 1400, and detect the lane marker or traffic signs in the obtained surrounding images.

As the number of solid lines of the lane marker between the driving lane on which the ego vehicle is driving and the expected driving lane decreases based on the detected lane marker information, the congested situation determiner 1210 may determine that the expected driving lane is congested.

When a shape of lane marker that is frequently used in a regularly congested section appears, that is, when the line between the driving lane and the expected driving lane is a dotted line-solid line, or when a solid line-dotted line or a solid line-solid line changes to a dotted line, the congested situation determiner 1210 may determine that the expected driving lane is congested.

When there is a "No cutting in" sign in the vicinity of the ego vehicle 1000 based on the detected traffic sign information, the congested situation determiner 1210 may determine that it is a congested situation. The congested situation determiner 1210 may be provided with the traffic sign information through the V2X communication module of the communicator 1100 in addition to the camera module of the object detector 1400 which provides the surrounding image.

The congested situation determiner 1210 may detect the surrounding vehicles from the surrounding image, extract a time and space feature vector from an image frame including the detected surrounding vehicles, determine a number of vehicles which show a cutting-in tendency through a deep learning artificial neural network (DNN) using the extracted time and space feature vector, and when the number of determined vehicles exceeds a predetermined threshold number, determine that the expected driving lane is congested.

The congested situation determiner 1210 may determine whether the vehicle shows a cutting-in tendency using a predetermined probabilistic method, and under the assumption that if there are many cutting-in vehicles, the possibility of a congested situation is high, the congested situation determiner 1210 may determine that the lane is congested when the number of vehicles cutting into the expected driving lane is larger than the predetermined number.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

Specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modeled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that has artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the Artificial Neural Network can include the synapse for connecting between neuron and neuron.

An ANN may be defined by the following three factors: (1) a connection pattern between neurons on different layers; (2) a learning process that updates synaptic weights; and (3) an activation function generating an output value from a weighted sum of inputs received from a previous layer.

ANNs may include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An ANN trained using training data can classify or cluster inputted data according to a pattern within the inputted data.

Throughout the present specification, an ANN trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

In addition, in the present specification, setting the label to the training data for training of the Artificial Neural Network is referred to as labeling the labeling data on the training data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data can represent a feature of the input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

When the congested situation determiner 1210 determines that the expected driving lane is congested, the lane change determiner 1220 may search for a first space and a second space, which are vehicle enterable spaces in the expected driving lane, and determine a space to be entered based on a comparison result between a characteristic of the first space and a characteristic of the second space. In this case, the vehicle enterable space in the expected driving lane, which is an empty space between two adjacent vehicles of a plurality of vehicles driving in the expected driving lane, may refer to a space having an interval where there is a possibility that the vehicle 1000 may cut in between a rear side of a vehicle which is driving ahead and a front side of a vehicle which is driving behind.

The lane change determiner 1220 may recognize a size of the first space and a size of the second space using position and distance sensors such as a lidar or radar or the camera module of the object detector 1400, compare the size of the first space and the size of the second space, and determine the larger of the two spaces as a space to be entered.

The lane change determiner 1220 may recognize a position of a plurality of vehicles including the other vehicle 1001 on the expected driving lane which is congested using the position and distance sensor such as a lidar or a radar of the object detector 140, or receive position information of the surrounding vehicle including the other vehicle 1001 through the V2X communication module of the communicator 1100 and thereby recognize available spaces in the expected driving lane, for example, sizes of the first space and the second space.

The lane change determiner 1220 may transmit a yield request signal to a vehicle driving in the expected driving lane through the communicator 1100, specifically, the V2X communication module.

Further, the lane change determiner 1220 may control the operation of a display device installed in the vehicle 1000 as the yield request signal for changing lanes. For example, the lane change determiner 1220 may control a flickering operation of a turn signal, a yield request image display operation, a yield request text display operation, and a driving direction projection operation.

The lane change determiner 1220 may analyze driving patterns of the vehicles at the front and rear of the searched available spaces, that is, the first space and the second space, and predict a securable space.

The vehicle change determiner 1220 may calculate an increase rate of a size of a space which is additionally generated in front of the first space and the second space in accordance with a driving speed history of the vehicles located in front of the searched available spaces, that is, the first space and the second space.

Further, the vehicle change determiner 1220 may calculate an increase rate of a size of a space which is additionally generated behind the first space and the second space in accordance with a driving speed history of the vehicles located behind the searched available spaces, that is, the first space and the second space.

The lane change determiner 1220 may periodically update the comparison result between the characteristic of the first space and the characteristic of the second space, and change the space to be entered based on the updated comparison result. However, when a wheel of the ego vehicle 1000 has crossed the lane marker between the driving lane on which the ego vehicle 1000 is driving and the expected driving lane, the lane change determiner 1220 may not change the space to be entered.

As long as the comparison result between the size or the increase rate of the size of the first space and the size or the increase rate of the size of the second space does not change, the lane change determiner 1220 maintains an available space having a larger size or a higher increase rate of the size among the two spaces as the space to be entered. When the comparison result between the size or the increase rate of the size of the first space and the size or the increase rate of the size of the second space changes, the lane change determiner 1220 may determine a newly set available space having a larger size or a higher increase rate of the size among the two spaces as the space to be entered. However, when a wheel of the ego vehicle 1000 has crossed the lane marker between the driving lane on which the ego vehicle 1000 is driving and the expected driving lane, the lane change determiner 1220 may maintain the space to be entered without changing the space to be entered, even if the comparison result between the size or the increase rate of the size of the first space and the size or the increase rate of the size of the second space has changed.

When the lane change determiner 1220 determines that a vehicle which is driving behind the first space is showing a behavior of approaching a lane marker between the driving lane on which the ego vehicle 1000 is driving and the expected driving lane, that is, the vehicle is determined as a non-yielding vehicle showing a driving pattern of angling towards one lane, the lane change determiner 1220 may reduce the possibility of selecting the first space as the space to be entered by reducing the size of the first space in accordance with a predetermined ratio before comparing the characteristic of the first space and the characteristic of the second space.

Under the assumption that a vehicle with no intention of yielding generally tends to drive to the left or right of the lane in order to interrupt cut-in driving, the lane change determiner 1220 may adjust the possibility of selecting the corresponding space as a space to be entered to be low when the vehicle which is driving behind the first space or the second space is angling towards the left or right.

The lane change controller 1230 may control the operator 1700 such that the autonomous vehicle changes lanes along a lane changing route leading to the space to be entered, selected by the lane change determiner 1220. When the space to be entered is selected, the lane change controller 1230 may generate a driving route to enter the selected space to be entered.

The vehicle controller 1200 may be implemented using at least one among application specific integrated circuits (ASICs), digital signal processors (DSPs), digital signal processing devices (DSPDs), programmable logic devices (PLDs), field [programmable gate arrays (FPGAs), processors, controllers, micro-controllers, microprocessors, and other electronic units for performing other functions.

The vehicle user interface 1300 may allow interaction between the vehicle 1000 and a vehicle user, receive an input signal of the user, transmit the received input signal to the vehicle controller 1200, and provide information included in the vehicle 1000 to the user under the control of the vehicle controller 1200. The vehicle user interface 1300 may include an input module, an internal camera, a biosensor module, and an output module, but is not limited thereto.

The input module may receive information from the user, and data collected by the input module may be analyzed by the vehicle controller 1200 so as to be processed as a control command of the user.

The input module may receive a destination of the vehicle 1000 from the user, and provide the destination to the vehicle controller 1200.

In accordance with the input of the user, the input module may input to the vehicle controller 1200 a signal which designates and inactivates at least one sensor module of a plurality of sensor modules of the object detector 1400.

The input module may be disposed inside the vehicle. For example, the input module may be disposed in one area of a steering wheel, one area of an instrument panel, one area of a seat, one area of each pillar, one area of a door, one area of a center console, one area of a head lining, one area of a sun visor, one area of a windshield, or one area of a window.

The output module may generate an output related to the visual, auditory, or tactile senses. The output module may output sounds or images.

The output module may include at least one of a display module, a sound output module, or a haptic output module.

The display module may display graphic objects corresponding to various information.

The display module may include at least one of a liquid crystal display (LCD), a thin film transistor liquid crystal display (TFT LCD), an organic light emitting diode (OLED), a flexible display, a 3D display, or an e-ink display.

The display module may form an interactive layer structure with a touch input module, or may be integrally formed with the touch input module to implement a touch screen.

The display module may be implemented as a head up display (HUD). When the display module is implemented as an HUD, the display module may include a project module, and output information through an image projected onto a windshield or a window.

The display module may include a transparent display. The transparent display may be attached to a window shield or a window.

The transparent display may display a predetermined screen with a predetermined transparency. In order to be transparent, the transparent display may include, for example, at least one among a transparent thin film electroluminescent (TFEL), a transparent organic light-emitting diode (OLED), a transparent liquid crystal display (LCD), a transmissive transparent display, and a transparent light emitting diode (LED). The transparency of the transparent display may be adjusted.

The vehicle user interface 1300 may include a plurality of display modules.

The display module may be disposed in one area of the steering wheel, one area of the instrument panel, one area of the seat, one area of each pillar, one area of the door, one area of the center console, one area of the head lining, or one area of the sun visor, or may be implemented on one area of the windshield or one area of the window.

The sound output module may convert an electrical signal provided from the vehicle controller 1200 into an audio signal. The sound output module may include at least one speaker.

The haptic output module may generate a tactile output. For example, the haptic output module may operate to vibrate a steering wheel, a seatbelt, and a seat so that the user may recognize an output.

The object detector 1400 may detect an object located outside the vehicle 1000, generate object information based on sensing data, and transmit the generated object information to the vehicle controller 1200. Examples of the object may include various objects related to the driving of the vehicle 1000, such as a lane, another vehicle, a pedestrian, a motorcycle, a traffic signal, light, a road, a structure, a speed bump, a landmark, and an animal.

The object detector 1400 is a plurality of sensor modules, and may include a camera module, a lidar (light imaging detection and ranging), an ultrasonic sensor, a radar (radio detection and ranging), and an infrared sensor.

The object detector 1400 may sense environment information around the vehicle 1000 through the plurality of sensor modules.

Depending on the embodiment, the object detector 1400 may further include constituent elements other than the constituent elements to be described, or may not include some of the constitute elements.

The radar may include an electromagnetic wave transmitting module and an electromagnetic wave receiving module. The radar may be implemented using a pulse radar method or a continuous wave radar method in terms of radio wave emission principle. The radar may be implemented using a frequency modulated continuous wave (FMCW) method or a frequency shift keying (FSK) method according to a signal waveform in a continuous wave radar method.

The radar may detect an object based on a time-of-flight (TOF) method or a phase-shift method using an electromagnetic wave as a medium, and detect the location of the detected object, the distance to the detected object, and the relative speed of the detected object.

The radar may be disposed at an appropriate position outside the vehicle for sensing an object disposed at the front, back, or side of the vehicle.

The lidar may include a laser transmitting module, and a laser receiving module. The lidar may be embodied using the time of flight (TOF) method or in the phase-shift method.

The lidar may be implemented as a driven type or a non-driven type.

When implemented as a driven type, the lidar may be rotated by a motor, and detect objects near the vehicle 1000. When implemented as a non-driven type, the lidar may detect objects within a predetermined range with respect to the vehicle 1000 by means of light steering. The vehicle 1000 may include a plurality of non-driven type lidars.

The lidar may detect an object using the time of flight (TOF) method or the phase-shift method using laser light as a medium, and detect the location of the detected object, the distance from the detected object and the relative speed of the detected object.

The lidar may be disposed at an appropriate position outside the vehicle for sensing an object disposed at the front, back, or side of the vehicle.

An image capturer may be located in an appropriate location of the outside of the vehicle, for example, a front side, a rear side, a right side mirror, and a left side mirror of the vehicle, so as to obtain an image of the outside of the vehicle. The image capturer may be a mono-camera, but is not limited thereto, and may be a stereo camera, an Around View Monitoring (AVM) camera, or a 360-degree camera.

In order to obtain an image of the front side of the vehicle, the image capturer may be disposed to be close to a front wind shield, inside the vehicle. Alternatively, the image capturer may be disposed in the vicinity of a front bumper or a radiator grill.

In order to obtain an image of the rear side of the vehicle, the image capturer may be disposed to be close to a rear glass, inside the vehicle. Alternatively, the image capturer may be disposed in the vicinity of a rear bumper, a trunk, or a tail gate.

In order to obtain images of the sides of the vehicle, the image capturer may be disposed to be close to at least one side window, inside the vehicle. Further, the image capturer may be disposed in the vicinity of fenders or doors.

The ultrasonic sensor may include an ultrasonic transmitting module, and an ultrasonic receiving module. The ultrasonic sensor may detect objects based on ultrasonic waves, and detect the location of the detected objects, the distance from the detected objects, and the relative speed of the detected objects.

The ultrasonic sensor may be disposed at an appropriate position outside the vehicle for sensing objects at the front, back, or side of the vehicle.

The infrared sensor may include an infrared transmitting module, and an infrared receiving module. The infrared sensor may detect objects based on infrared light, and detect the location of the detected objects, the distance from the detected objects, and the relative speed of the detected objects.

The infrared sensor may be disposed at an appropriate position outside the vehicle for sensing objects at the front, back, or side of the vehicle.

The vehicle controller 1200 may control the overall operation of the object detector 1400.

The vehicle controller 1200 may compare data sensed by the radar, the lidar, the ultrasonic sensor, and the infrared sensor with pre-stored data so as to detect or classify an object.

The vehicle controller 1200 may detect and track objects based on the obtained image. The vehicle controller 1200 may perform operations such as calculation of the distance to an object and calculation of the relative speed of the object through image processing algorithms.

For example, the vehicle controller 1200 may obtain the distance information to the object and the relative speed information of the object from the obtained image based on the change of size of the object over time.

For example, the vehicle controller 1200 may obtain the distance information to the object and the relative speed information of the object through, for example, a pin hole model and road surface profiling.

The vehicle controller 1200 may detect and track the object based on the reflected electromagnetic wave reflected back from the object. The vehicle controller 1200 may perform operations such as calculation of the distance to the object and calculation of the relative speed of the object based on the electromagnetic waves.

The vehicle controller 1200 may detect and track the object based on the reflected laser light reflected back from the object. Based on the laser light, the vehicle controller 1200 may perform operations such as calculation of the distance to the object and calculation of the relative speed of the object based on the laser light.

The vehicle controller 1200 may detect and track the object based on the reflected ultrasonic wave reflected back from the object. The vehicle controller 1200 may perform operations such as calculation of the distance to the object and calculation of the relative speed of the object based on the reflected ultrasonic wave.

The vehicle controller 1200 may detect and track the object based on the reflected infrared light reflected back from the object. The vehicle controller 1200 may perform operations such as calculation of the distance to the object and calculation of the relative speed of the object based on the infrared light.

Depending on the embodiment, the object detector 1400 may include a separate processor from the vehicle processor 1200. In addition, the radar, the lidar, the ultrasonic sensor, and the infrared sensor may each include a processor.

When a processor is included in the object detector 1400, the object detector 1400 may be operated under the control of the processor controlled by the vehicle controller 1200.

The driving controller 1500 may receive a user input for driving. In the manual mode, the vehicle 1000 may be driven based on a signal provided by the driving controller 1500.

The vehicle driver 1600 may electrically control the driving of various apparatuses in the vehicle 1000. The vehicle driver 1600 may electrically control the operations of a powertrain, a chassis, a door/window, a safety device, a lamp, and an air conditioner.

The operator 1700 may control various operations of the vehicle 1000. The operator 1700 may operate in the autonomous driving mode.

The operator 1700 may include a driving module, an unparking module, and a parking module.

Depending on the embodiment, the operator 1700 may further include constituent elements other than the constituent elements to be described, or may not include some of the constitute elements.

The operator 1700 may include a processor under the control of the vehicle controller 1200. Each module of the operator 1700 may include a processor individually.

Depending on the embodiment, when the operator 1700 is implemented as software, it may be a sub-concept of the vehicle controller 1200.

The driving module may perform driving of the vehicle 1000.

The driving module may receive object information from the object detection unit 1400, and provide a control signal to a vehicle driving module to perform the driving of the vehicle 1000.

The driving module may receive a signal from an external device through the communicator 1100, and provide a control signal to the vehicle driving module, so that the driving of the vehicle 1000 may be performed.

The unparking module, may perform unparking of the vehicle 1000.

The unparking module may receive navigation information from the navigation module, and provide a control signal to the vehicle driving module to perform the departure of the vehicle 1000.

The unparking module may receive object information from the object detection unit 1400, and provide a control signal to the vehicle driving module so as to perform the unparking of the vehicle 1000.

The unparking module may receive a signal from an external device via the communicator 1100, and provide a control signal to the vehicle driving module to perform the unparking of the vehicle 1000.

The parking module may perform parking of the vehicle 1000.

The parking module may receive navigation information from the navigation module, and provide a control signal to the vehicle driving module to perform the parking of the vehicle 1000.

The parking module may receive object information from the object detection unit 1400, and provide a control signal to the vehicle driving module so as to perform the parking of the vehicle 1000.

The parking module may receive a signal from an external device via the communicator 1100, and provide a control signal to the vehicle driving module so as to perform the parking of the vehicle 1000.

The navigation module may provide navigation information to the vehicle controller 1200. The navigation information may include at least one among map information, set destination information, route information according to destination setting, information on various objects on the route, lane information, and current location information of the vehicle.

The navigation module may provide the vehicle controller 1200 with a parking lot map of a parking entered by the vehicle 1000. The vehicle controller 1200, when the vehicle 1000 enters a parking lot, may be provided with a map of the parking lot from the navigation module, and may reflect a calculated movement route and fixed identification information to the parking lot map so as to generate map data.

The navigation module may include a memory. The memory may store navigation information. The navigation information may be updated by information received through the communicator 1100. The navigation module may be controlled by an internal processor, or may operate by receiving an external signal, for example, a control signal from the vehicle controller 1200, but the present disclosure is not limited thereto.

The driving module of the operator 1700 may be provided with the navigation information from the navigation module, and may provide a control signal to the vehicle driving module so that driving of the vehicle 1000 may be performed.

The sensor 1800 may sense the state of the vehicle 1000 using a sensor mounted on the vehicle 1000, that is, a signal related to the state of the vehicle 1000, and obtain movement route information of the vehicle 1000 according to the sensed signal. The sensor 1800 may provide the obtained movement route information to the vehicle controller 1200.

The sensor 1800 may include a posture sensor (for example, a yaw sensor, a roll sensor, and a pitch sensor), a collision sensor, a wheel sensor, a speed sensor, a tilt sensor, a weight sensor, a heading sensor, a gyro sensor, a position module, a vehicle forward/reverse movement sensor, a battery sensor, a fuel sensor, a tire sensor, a steering sensor by rotation of a steering wheel, a vehicle interior temperature sensor, a vehicle interior humidity sensor, an ultrasonic sensor, an illuminance sensor, an accelerator pedal position sensor, and a brake pedal position sensor, but is not limited thereto.

The sensor 1800 may acquire sensing signals for information such as vehicle posture information, vehicle collision information, vehicle direction information, vehicle position information (GPS information), vehicle angle information, vehicle speed information, vehicle acceleration information, vehicle tilt information, vehicle forward/reverse movement information, battery information, fuel information, tire information, vehicle lamp information, vehicle interior temperature information, vehicle interior humidity information, a steering wheel rotation angle, vehicle exterior illuminance, pressure on an acceleration pedal, and pressure on a brake pedal.

The sensor 1800 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), but is not limited thereto.

The sensor 1800 may generate vehicle status information based on sensing data. The vehicle status information may be information generated based on data sensed by various sensors included in the inside of the vehicle.

The vehicle status information may include at least one among posture information of the vehicle, speed information of the vehicle, tilt information of the vehicle, weight information of the vehicle, direction information of the vehicle, battery information of the vehicle, fuel information of the vehicle, tire air pressure information of the vehicle, steering information of the vehicle, vehicle interior temperature information, vehicle interior humidity information, pedal position information, and vehicle engine temperature information.

The vehicle storage 1900 may be electrically connected to the vehicle controller 1200. The vehicle storage 1900 may store basic data on each unit of the lane changing apparatus of an autonomous vehicle, control data for controlling the operation of each unit of the lane changing apparatus of an autonomous vehicle, and input/output data. The vehicle storage 1900 may be various storage devices such as a ROM, a RAM, an EPROM, a flash drive, and a hard drive, in terms of hardware. The vehicle storage 1900 may store various data for overall operations of the vehicle 1000, such as a program for processing or controlling the vehicle controller 1200, specifically, driver's tendency information. The vehicle storage 1900 may be integrally formed with the vehicle controller 1200, or implemented as a sub-component of the vehicle controller 1200.

Figure 10:
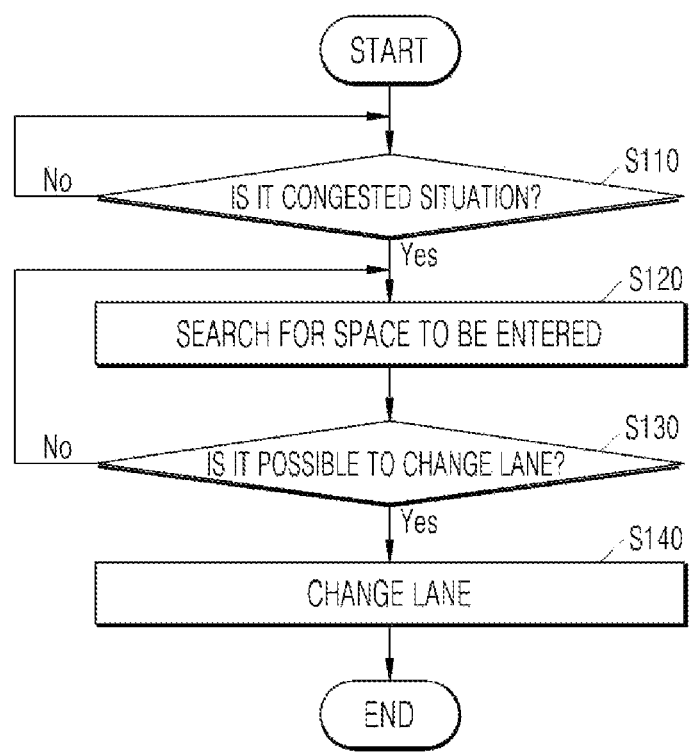
FIGS. 10 to 12 are operation flowcharts illustrating a lane changing method of an autonomous vehicle according to an embodiment of the present disclosure.
Figure 11:
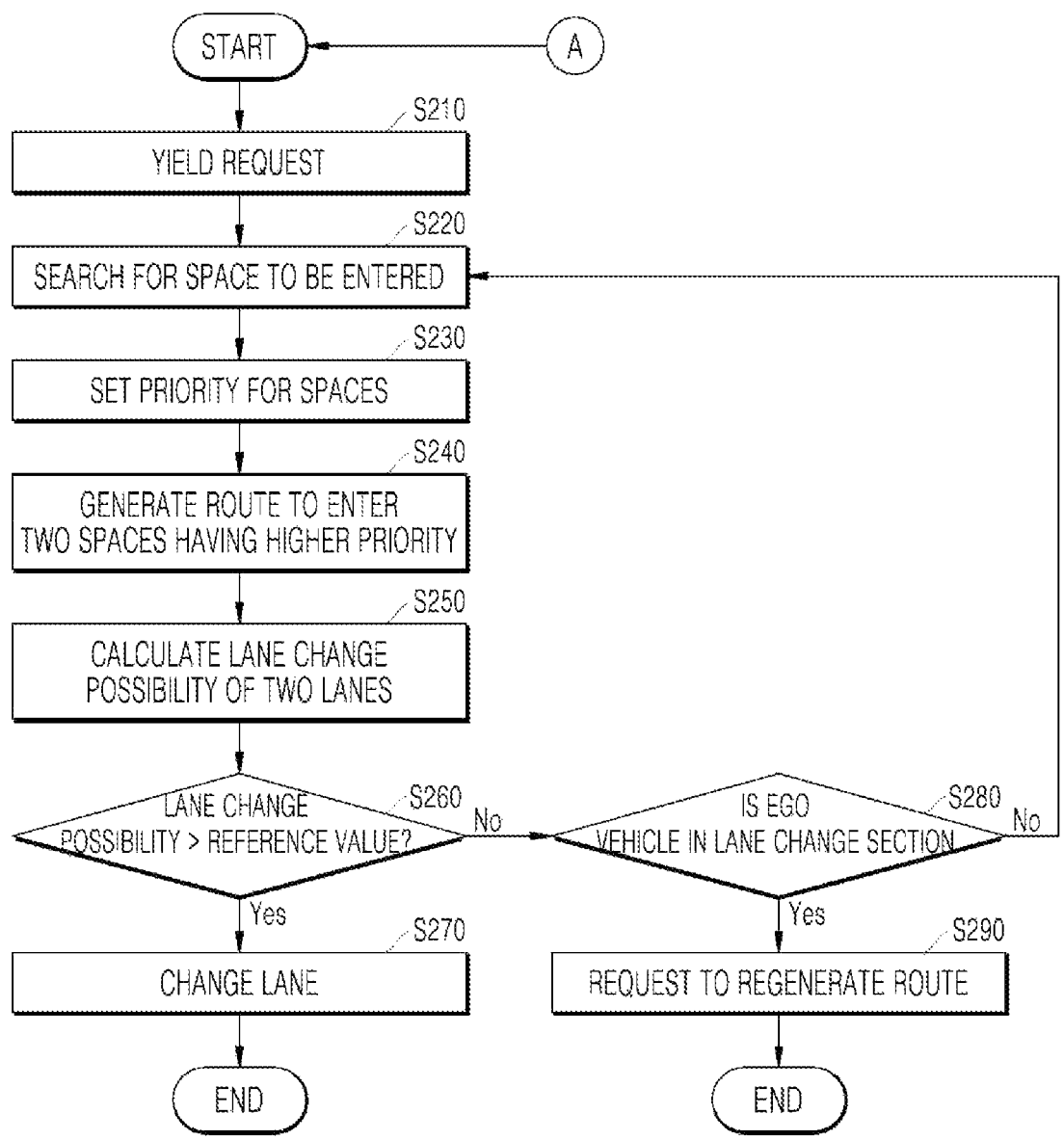
Figure 12:
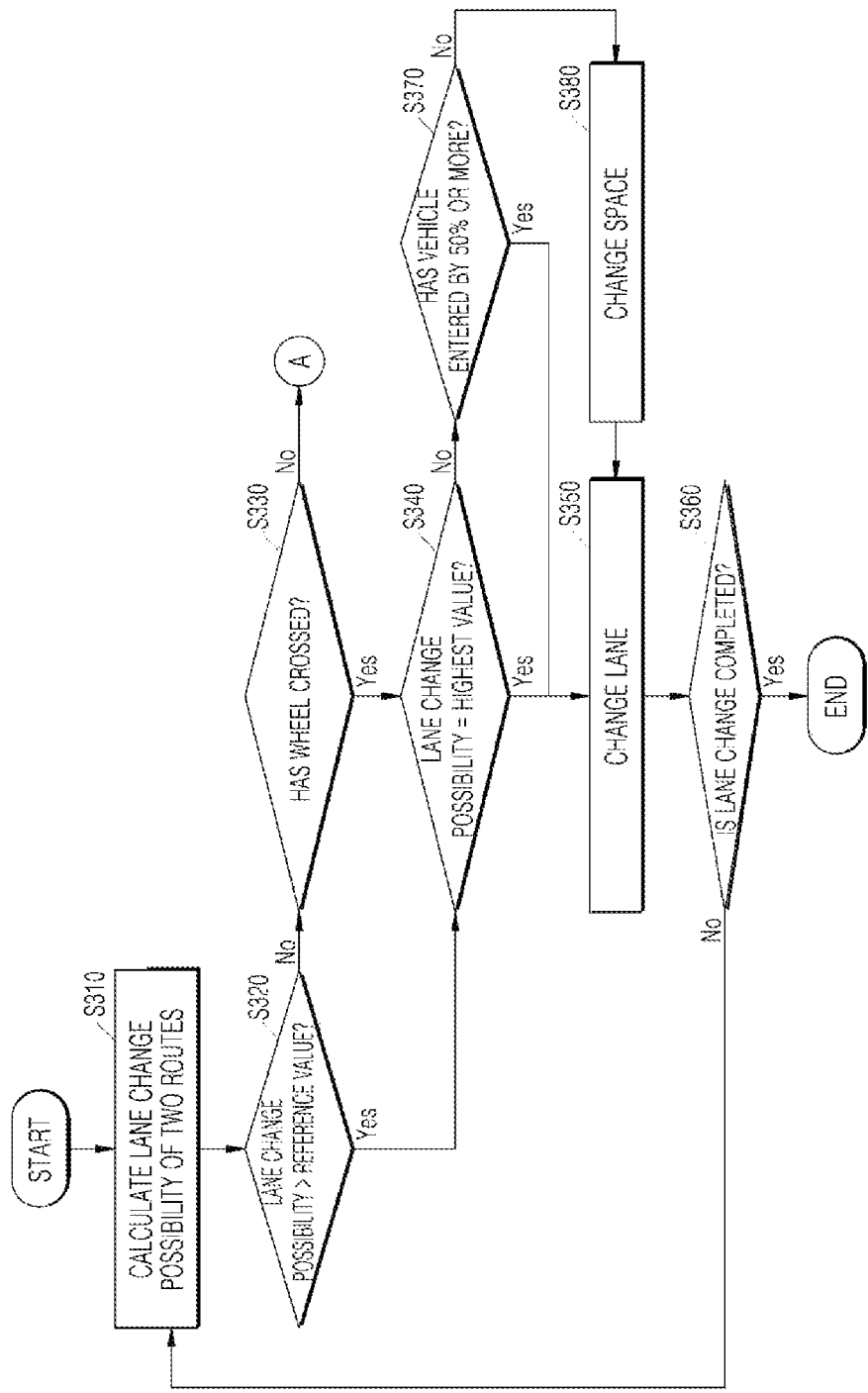

FIGS. 10 to 12 are operation flowcharts illustrating a lane changing method of an autonomous vehicle according to an embodiment of the present disclosure.

Figure 13A:
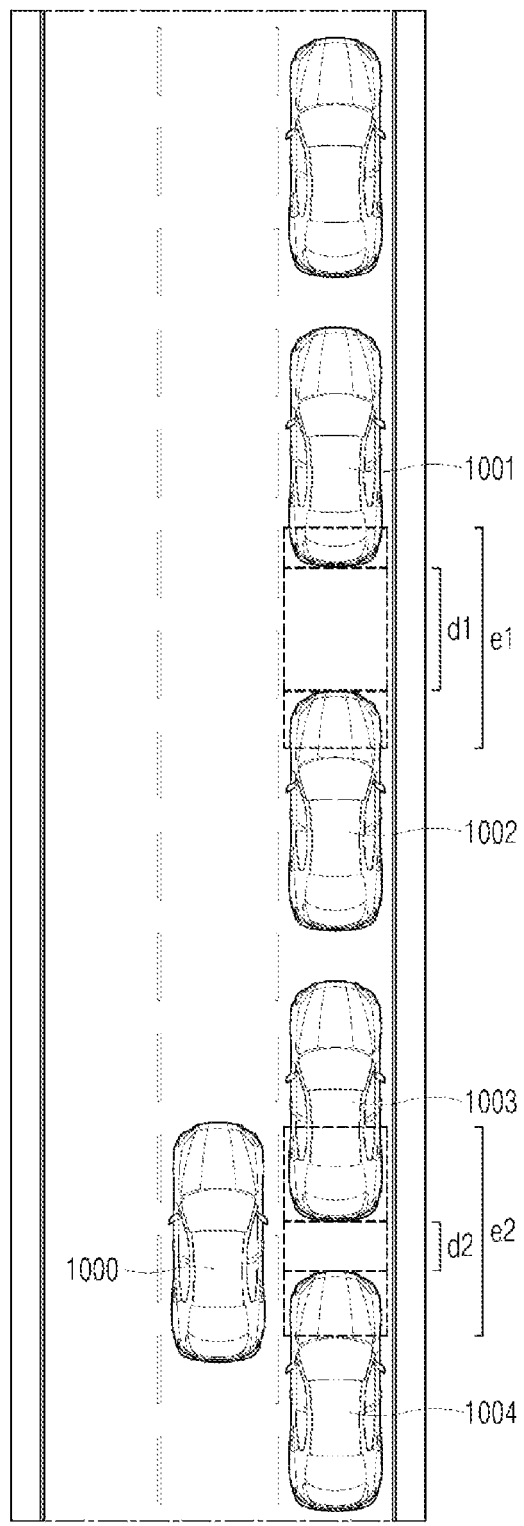
FIGS. 13A and 13B are diagrams illustrating an operation of a lane changing apparatus of an autonomous vehicle according to an embodiment of the present disclosure.
Figure 13B:
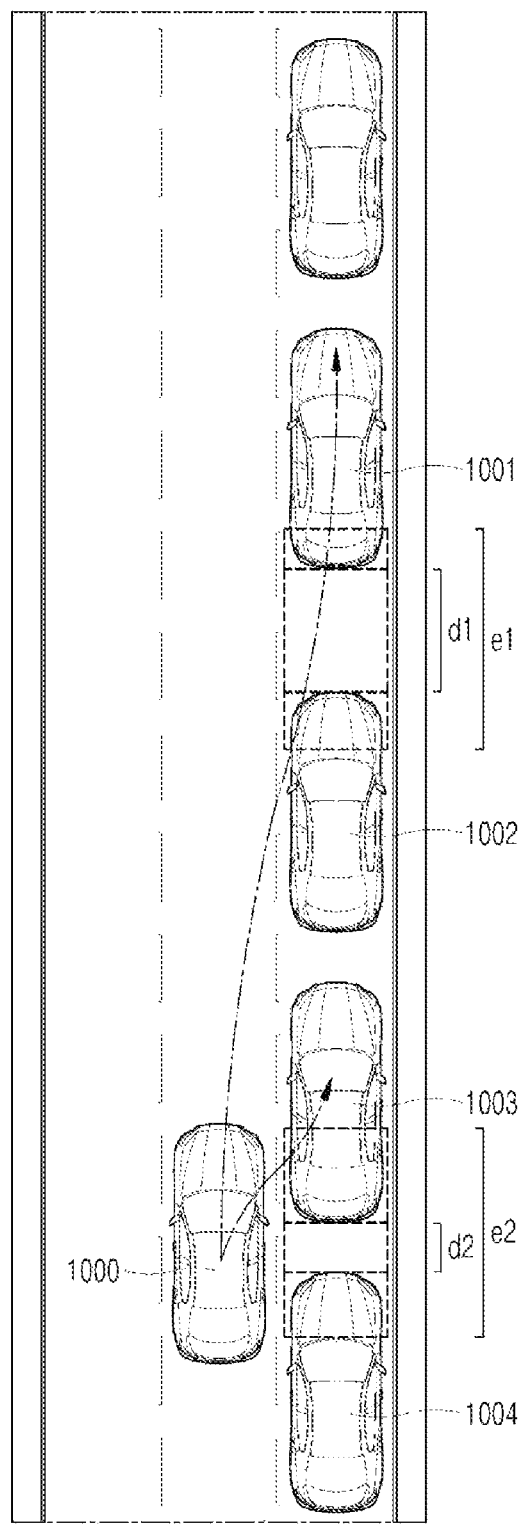

FIGS. 13A and 13B are views illustrating an operation of a lane changing apparatus of an autonomous vehicle according to an embodiment of the present disclosure.

A lane changing method of an autonomous vehicle according to an embodiment of the present disclosure and an operation of a lane changing apparatus of an autonomous vehicle according to an embodiment of the present disclosure will be described below with reference to FIGS. 10 to 13B.

The congested situation determiner 1210 may determine whether an expected driving lane on which the ego vehicle will be driven later, such as an exit or entrance section, is congested, based on the driving information in step S110.

When a speed of a vehicle which is driving in the driving lane is faster than a speed of a vehicle which is driving in the expected driving lane, the congested situation determiner 1210 may determine that the expected driving lane is congested. In this case, the speed of the vehicle which is driving in the driving lane may be a chassis speed of the ego vehicle 1000.

The congested situation determiner 1210 may estimate speeds of surrounding vehicles by using chassis information and pose information of the surrounding vehicles which are recognized through the lidar, the radar, and the camera module of the object detector 1400, and determine average speeds of a plurality of vehicles in the expected driving lane including the other vehicle 1001 among the surrounding vehicles as an expected driving lane speed.

The congested situation determiner 1210 may obtain surrounding images through the camera module of the object detector 1400, detect traffic signs in the obtained surrounding images or recognize traffic sign information through the V2X communication module of the communicator 1100, and when a "No cutting in" sign is disposed in the vicinity of the ego vehicle 1000, may determine that it is a congested situation based on the detected or recognized traffic sign information.

The congested situation determiner 1210 may obtain the surrounding images through the camera module of the object detector 1400, detect a lane marker in the obtained surrounding images, and when the detected lane marker between the driving lane and the expected driving lane is a dotted line-solid line, or a solid line-dotted line or a solid line-solid line changes to a dotted line, may determine that the expected driving lane is congested.

The congested situation determiner 1210 may determine whether the vehicle shows a cutting-in tendency using DNN or a probabilistic method, and under the assumption that if there are many cutting-in vehicles, the possibility of congested situation is high, when the number of vehicles cutting into the expected driving lane is larger than the predetermined number, the congested situation determiner 1210 may determine that the lane is congested.

The congested situation determiner 1210 may be provided with real-time traffic information from infrastructure through the V2X communication module of the communicator 1100 and may determine the congested situation based on the provided real-time traffic information.

When the congested situation determiner 1210 determines that the expected driving lane is congested, the lane change determiner 1220 may search for a first space and a second space, which are vehicle enterable spaces in the expected driving lane in step S120, and determine a space to be entered based on a comparison result between a characteristic of the first space and a characteristic of the second space. In this case, according to the embodiment of the present disclosure, for convenience of description, it is assumed that there are two spaces (the first space and the second space) as available spaces which are enterable spaces, but the embodiment is not limited thereto, and the available spaces may be extended to n spaces.

In step S210, the lane change determiner 1220 may notify other vehicles 1001, 1002, 1003, and 1004 of a lane change through a flickering operation of a turn signal, a yield request image display operation, a yield request text display operation, and a driving direction projection operation, and request the other vehicles 1001, 1002, 1003, and 1004 to yield.

The lane change controller 1230 may control the operator 1700 to calculate a driving reference speed based on a driving speed of the other vehicles 1001, 1002, 1003, and 1004, which are driving in the expected driving lane, and drive the vehicle at the calculated speed.

The lane change determiner 1220 may search for available spaces having predetermined sizes d1 and d2 in step S220.

The lane change determiner 1220 may recognize the size of the first space and the size of the second space using position and distance sensors such as a lidar and a radar or a camera module of the object detector 1400. That is, the lane change determiner 1220 may recognize a position of a plurality of vehicles including the other vehicle 1001 on the expected driving lane which is congested using the position and distance sensor such as a lidar or radar of the object detector 140, or receive position information of the surrounding vehicle including the other vehicle 1001 through the V2X communication module of the communicator 1100 and thereby recognize available spaces in the expected driving lane, for example, sizes of the first space and the second space.

The lane change determiner 1220 may analyze driving patterns of the vehicles at the front and rear of the searched available spaces, that is, the first space and the second space, and predict sizes e1 and e2 of securable spaces.

The vehicle change determiner 1220 may calculate an increase rate of a size of a space which is additionally generated in front of the first space and the second space in accordance with a driving speed history of the vehicles located in front of the searched available space, that is, the first space and the second space, calculate an increase rate of a size of a space which is additionally generated behind the first space and the second space in accordance with a driving speed history of the vehicles located behind the searched available space, that is, the first space and the second space, and predict the sizes e1 and e2 of the securable spaces at the time of changing lanes in accordance with the calculated increase rates of the front side and the rear side.

In step S230, the lane change determiner 1220 may determine a priority of the first space and the second space in size order of currently recognized sizes d1 and d2. When the sizes of the first space and the second space are equal to or smaller than a predetermined minimum size, the priority may be determined in size order of sizes e1 and e2 of securable spaces.

The lane change determiner 1220 may select a space having the highest priority as a space to be entered, which is a lane change target space, or select two spaces having the highest priorities as candidate spaces to be entered, which are lane change target candidate spaces.

In step S240, the lane change determiner 1220 may generate a route for entering the space to be entered, or a route for entering two spaces having the highest priority.

When the lane change determiner 1220 generates a route for entering the space to be entered, the lane change controller 1230 may control the ego vehicle 1000 in accordance with the generated route.

In addition, after generating a first route for entering the space to be entered, the lane change determiner 1220 may generate a second route for entering a candidate space to be entered having the next highest priority after the space to be entered. When two routes are generated in this way, it is easy to cope with a situation where a plurality of vehicles try to cut in, or when the difference between the speed of the ego vehicle 1000 and the average speed of the other vehicles 1001, 1002, 1003, and 1004 driving in the expected driving lane is large.

In step S130 or S250, the lane change determiner 1220 may calculate a lane change possibility for the first route and the second route. When calculating the lane change possibility, the lane change determiner 1220 may use the equation shown below, under the assumption that when the size of the candidate spaces to be entered corresponding to each route gradually increases, the lane change possibility increases, and when the behavior of the vehicles behind the candidate spaces to be entered is angled towards one lane, the lane change possibility decreases.

$$P=(0.7\times\text{norm}(e'))+(0.3\times\text{norm}(dw)) \quad \text{Equation 1:}$$

Here, P is a lane change possibility as a value between 0 and 1, e' is an increase rate of a size of a securable space, norm(x) is a variable normalized to be 1 if x is equal to or greater than a maximum value and 0 if x is equal to or smaller than a minimum value, which may be represented by the following equation:

$$\text{norm}(x) = \frac{x - x_{min}}{x_{max} - x_{min}} \quad \text{Equation 2}$$

Further, dw indicates a distance between a side surface of a vehicle 1002 at the rear of the first space or a side surface of a vehicle 1004 at the rear of the second space and the adjacent driving lane of the expected driving lane.

In step S130 or S260, the lane change determiner 1220 may determine whether the lane change possibility is equal to or greater than a predetermined reference value. Although the lane change determiner 1220 may determine a reference value to be compared with the lane change possibility by a constant, the lane change determiner 1220 may increase the number of attempts to change lanes in a lane change section where the lane change is to be performed by determining the reference value as a variable which decreases as the ego vehicle 1000 approaches the end of the section.

In step S140 or S270, when the lane change determiner 1220 determines that the lane change possibility is equal to or greater than a predetermined reference value, the lane change controller 1230 may control the operator 1700 to change the lane.

When the lane change possibility is determined to be smaller than a predetermined reference value, the lane change determiner 1220 may determine whether the ego vehicle 1000 is located in a lane change possible section in step S280. When the ego vehicle 1000 is not located in a lane change possible section, an operation for searching for a space to be entered may be performed again. That is, when the lane change fails, the lane change determiner 1220 may switch the mode to a search mode to re-search for a space to be entered.

When the ego vehicle 1000 is located in a lane change possible section, the lane change determiner 1220 may regenerate a route for entering the space to be entered in step S290.

Further, the lane change determiner 1220 may calculate a lane change possibility for the first route and the second route in step S310, and may determine whether the lane change possibility is equal to or greater than the predetermined reference value in step S320.

In step S330, when the lane change possibility is smaller than the predetermined reference value, the lane change determiner 1220 may determine whether a wheel of the ego vehicle 1000 has crossed the lane marker between the driving lane on which the ego vehicle 1000 is driving and the expected driving lane.

When a wheel of the ego vehicle 1000 has not crossed the lane marker between the driving lane on which the ego vehicle 1000 is driving and the expected driving lane, the lane change determiner 1220 may notify the other vehicles 1001, 1002, 1003, and 1004 of the lane change through a flickering operation of a turn signal, a yield request image display operation, a yield request text display operation, and a driving direction projection operation, and re-perform the yield request operation of S210.

In step S340, when a wheel of the ego vehicle 1000 has crossed the lane marker between the driving lane on which the ego vehicle 1000 is driving and the expected driving lane, the lane change determiner 1220 may determine whether the lane change possibility is 1, which is a highest value.

In step S340, even when the lane change possibility is equal to or larger than the predetermined reference value, the lane change determiner 1220 may determine whether the lane change possibility is 1, which is a highest value.

When the lane change possibility is the highest value, the lane change controller 1230 may control the operator 1700 to change the lane of the ego vehicle 1000 from the driving lane to the expected driving lane (S350).

When the lane change is completed, the process is completed, and when the lane change is not completed, the lane change determiner 1220 may start again from the operation of calculating the lane change possibility for the first route and the second route.

In step S370, when the lane change possibility is not the highest value, the lane change determiner 1220 may determine whether the ego vehicle 1000 has entered the expected driving lane by 50% or more.

When the ego vehicle 1000 has entered the expected driving lane by 50% or more, the lane change controller 1230 may control the operator 1700 to change the lane of the ego vehicle 1000 from the driving lane to the expected driving lane (S350).

When the ego vehicle 1000 has not entered the expected driving lane by 50% or more, the lane change determiner 1220 may change the space to be entered in step S380, and by controlling the operator 1700 to drive the ego vehicle 1000 to the changed space to be entered, the lane change controller 1230 may change the driving lane to the expected driving lane (S350).

The above-mentioned present disclosure may be implemented as a computer-readable code in a recording medium in which at least one program is written. The computer-readable medium includes all types of recording devices in which data readable by a computer system readable can be stored. Examples of the computer-readable medium include a hard disk drive (HDD), a solid state disk (SSD), a silicon disk drive (SDD), a read-only memory (ROM), a random-access memory (RAM), CD-ROM, a magnetic tape, a floppy disk, an optical data storage device, and the like, and it may also be implemented in the form of a carrier wave (for example, transmission over the Internet). In addition, the computer may include a processor or a controller. Therefore, the above description should not be construed as limiting and should be considered illustrative. The scope of the present disclosure should be determined by rational interpretation of the appended claims, and all changes within the scope of equivalents of the present disclosure are included in the scope of the present disclosure.

What is claimed is:

1. A lane changing apparatus of an autonomous vehicle configured to change a driving lane in consideration of a congested situation, the lane changing apparatus comprising:
a controller configured to:
determine whether an expected driving lane is congested based on driving information,
search for a first space and a second space, which are vehicle enterable spaces in the expected driving lane, and determine a space to be entered based on a comparison result between a characteristic of the first space and a characteristic of the second space based on determination that the expected driving lane is congested, and control the autonomous vehicle to change lanes along a lane changing route leading to the space to be entered; and a communicator configured to receive the driving information, and wherein the comparison result between the characteristic of the first space and the characteristic of the second space comprises a result of comparing a size of the first space and a size of the second space, wherein the driving information comprises a driving lane speed which is a chassis speed of the autonomous vehicle, and an expected driving lane speed which is a chassis speed of a vehicle moving along the expected driving lane, and when the driving lane speed exceeds the expected driving lane speed, the controller determines that the expected driving lane is congested.

2. A lane changing apparatus of an autonomous vehicle configured to change a driving lane in consideration of a congested situation, the lane changing apparatus comprising:

a controller configured to:
  determine whether an expected driving lane is congested based on driving information,
  search for a first space and a second space, which are vehicle enterable spaces in the expected driving lane, and determine a space to be entered based on a comparison result between a characteristic of the first space and a characteristic of the second space based on determination that the expected driving lane is congested, and control the autonomous vehicle to change lanes along a lane changing route leading to the space to be entered; and a communicator configured to receive the driving information, and wherein the comparison result between the characteristic of the first space and the characteristic of the second space comprises a result of comparing a size of the first space and a size of the second space, and wherein the driving information comprises lane marker information, and when the number of solid lines of the lane marker between the driving lane on which the autonomous vehicle is driving and the expected driving lane decreases based on the lane marker information, the controller determines that the expected driving lane is congested.

3. A lane changing apparatus of an autonomous vehicle configured to change a driving lane in consideration of a congested situation, the lane changing apparatus comprising:

a controller configured to:
  determine whether an expected driving lane is congested based on driving information,
  search for a first space and a second space, which are vehicle enterable spaces in the expected driving lane, and determine a space to be entered based on a comparison result between a characteristic of the first space and a characteristic of the second space based on determination that the expected driving lane is congested, and control the autonomous vehicle to change lanes along a lane changing route leading to the space to be entered; and a communicator configured to receive the driving information, and wherein the comparison result between the characteristic of the first space and the characteristic of the second space comprises a result of comparing a size of the first space and a size of the second space, and wherein the driving information comprises surrounding image information, and the controller detects surrounding vehicles from the surrounding image, extracts a time and space feature vector from an image frame including the detected surrounding vehicles, determines a number of vehicles which show a cutting-in tendency through a deep learning artificial neural network using the extracted time and space feature vector, and when the number of determined vehicles exceeds a predetermined threshold number, determines that the expected driving lane is congested.

4. The lane changing apparatus according to claim 1, wherein the comparison result between the characteristic of the first space and the characteristic of the second space further comprises a result of comparing an increase rate of the size of the first space and an increase rate of the size of the second space.

5. The lane changing apparatus according to claim 1, further comprising:
  a communicator configured to communicate with a vehicle which is driving in the expected driving lane,
  wherein when the controller determines that the expected driving lane is congested, the controller generates a yield request signal for changing lanes, and transmits the yield request signal to the vehicle which is driving in the expected driving lane through the communicator.

6. The lane changing apparatus according to claim 1, wherein the controller periodically updates the comparison result between the characteristic of the first space and the characteristic of the second space, and changes the space to be entered based on the updated comparison result, while not changing the space to be entered when a wheel of the autonomous vehicle has crossed a lane marker between the driving lane on which the autonomous vehicle is driving and the expected driving lane.

7. The lane changing apparatus according to claim 1, wherein when the controller determines that a vehicle which is driving behind the first space is a non-yielding vehicle which is approaching the lane marker between the driving lane on which the autonomous vehicle is driving and the expected driving lane, the controller reduces the size of the first space in accordance with a predetermined ratio before comparing the characteristic of the first space and the characteristic of the second space.

8. The lane changing apparatus according to claim 5, wherein the communicator receives the driving information based on a downlink grant of a 5G network connected to drive the autonomous vehicle in an autonomous driving mode.

* * * * *